Figure 4:
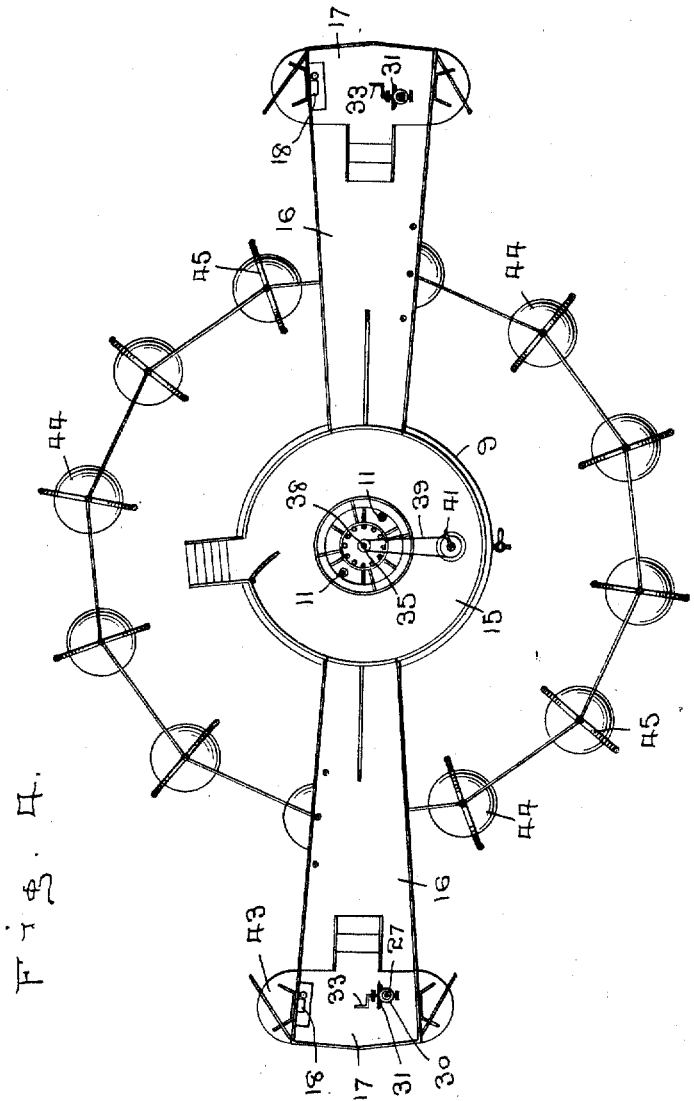

G. SCHEEL.
AIRSHIP CONSTRUCTION.
APPLICATION FILED JUNE 17, 1910.
994,202.
Patented June 6, 1911.
4 SHEETS—SHEET 1.
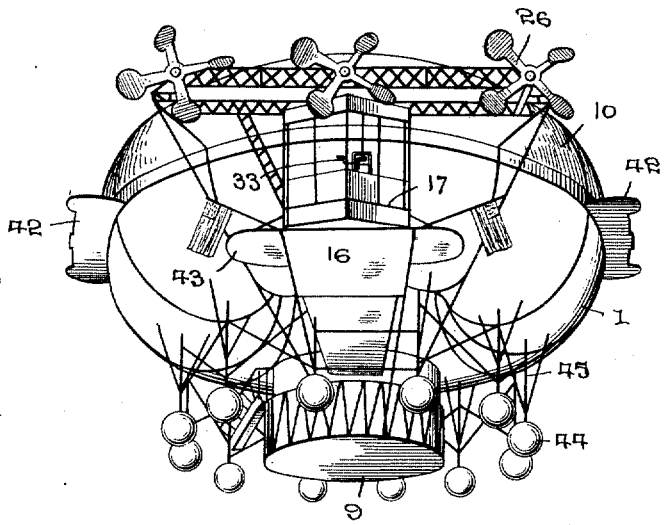
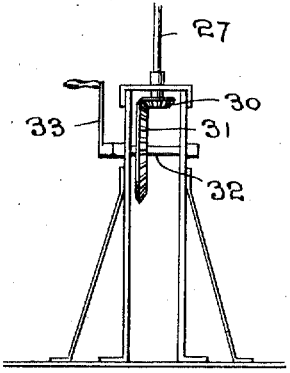
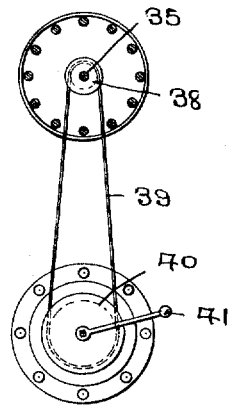
WITNESSES:
Thos W. Riley
M. Newcomb
INVENTOR
G. Scheel
BY
W. J. Fitzgerald
Attorneys

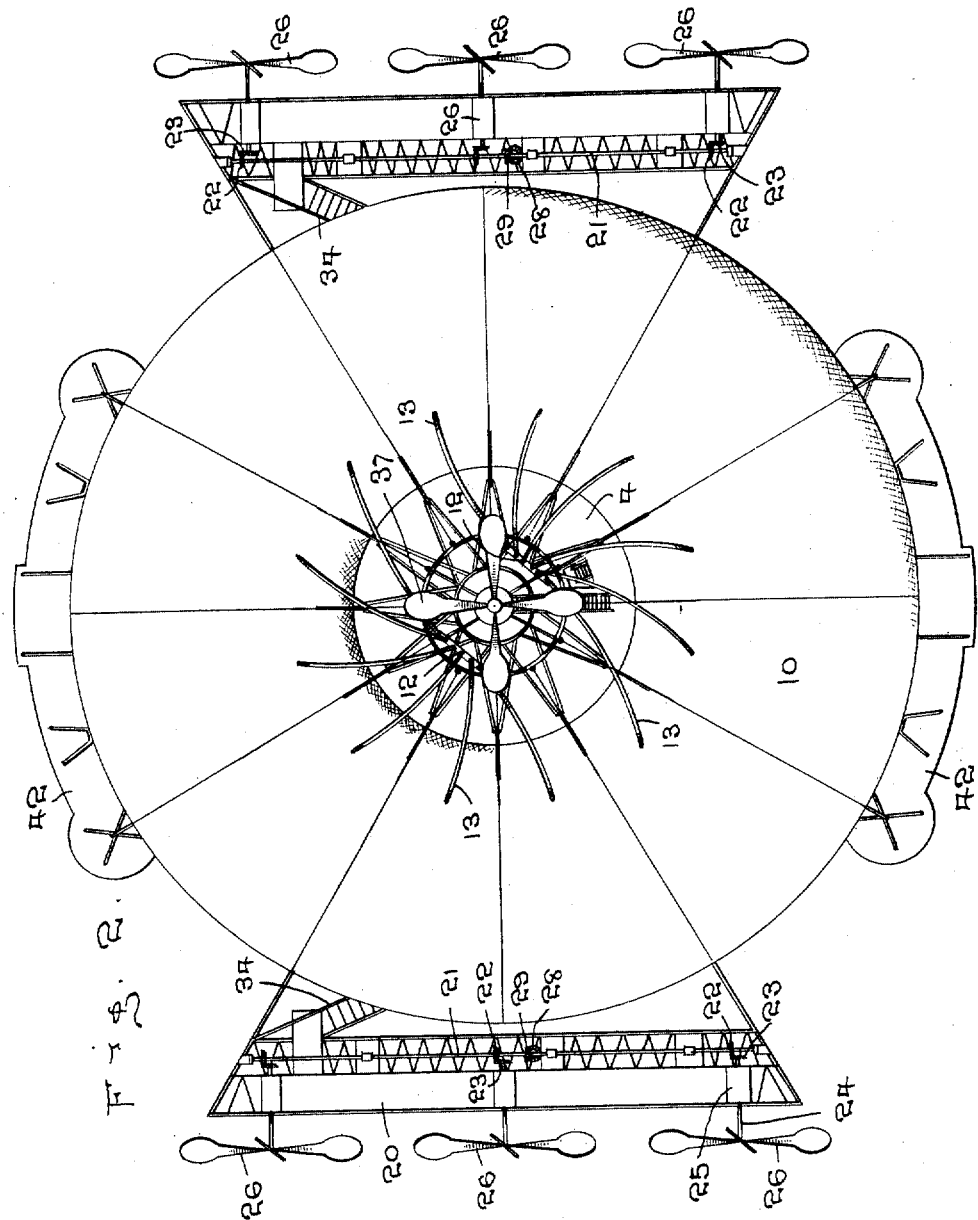

G. SCHEEL.
AIRSHIP CONSTRUCTION.
APPLICATION FILED JUNE 17, 1910.
994,202.
Patented June 6, 1911
4 SHEETS—SHEET 3.
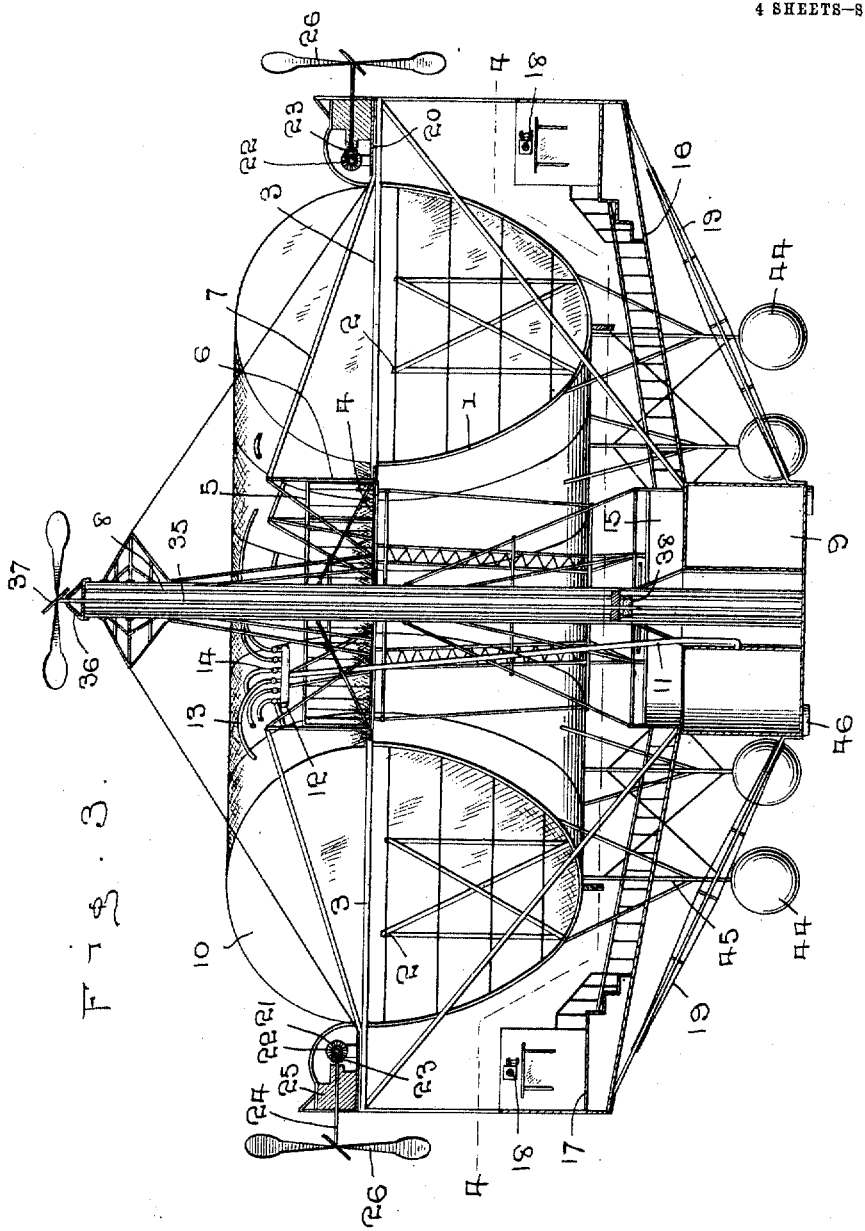

G. SCHEEL.
AIRSHIP CONSTRUCTION.
APPLICATION FILED JUNE 17, 1910.

994,202.

Patented June 6, 1911.
4 SHEETS—SHEET 4.

WITNESSES:

INVENTOR
G. Scheel
BY
W.J. Fitzgerald HG
Attorneys

UNITED STATES PATENT OFFICE.

GUSTAV SCHEEL, OF NEW YORK, N. Y.

AIRSHIP CONSTRUCTION.

994,202.  Specification of Letters Patent.  Patented June 6, 1911.

Application filed June 17, 1910. Serial No. 567,468.

*To all whom it may concern:*

Be it known that I, GUSTAV SCHEEL, a citizen of the United States, residing at New York, in the county of New York and State of New York, have invented certain new and useful Improvements in Airship Constructions; and I do hereby declare the following to be a full, clear, and exact description of the invention, such as will enable others skilled in the art to which it appertains to make and use the same.

My invention relates to new and useful improvements in airship constructions and my object is to provide a suitable framework and place thereon compartments for passengers.

A further object is to provide dirigible compartments for supporting the framework in the air.

A further object is to provide a tank for holding a supply of gas.

A further object is to provide means for conveying the gas from the tank to the dirigible sections.

A further object is to provide a plurality of floats for supporting the frame-work should the device enter a body of water.

A further object is to provide means for causing the airship to ascend or descend.

A further object is to provide wings for the airship, and, a further object is to provide means for propelling or guiding the airship.

Other objects and advantages will be hereinafter referred to and more particularly pointed out in the specification hereunto annexed.

In the accompanying drawings which are made a part of this application, Figure 1 is a perspective view of the airship. Fig. 2 is a top plan view thereof. Fig. 3 is a transverse sectional view through the machine. Fig. 4 is a horizontal sectional view as seen on line 4—4 Fig. 3. Fig. 5 is a detail elevation of the propelling mechanism for the guiding blades, and, Fig. 6 is a top plan view partly in section showing the manner of operating the raising and lowering blades.

Referring to the drawings in which similar reference numerals designate corresponding parts throughout the several views, 1 indicates the frame of my improved airship, which is preferably circular in general outline and substantially semicircular in cross section and extending across the interior of the frame 1 are braces 2, said braces dividing the interior of the frame into compartments and preferably twelve in number, although any desired number of compartments may be formed.

Extending across the top of the frame 1 are bars 3, which terminate at their inner ends in a platform 4, said platform being surrounded by the frame 1 and by placing a suitable railing 5 around the platform, it may be used for the reception of passengers.

The railing 5 is supported by means of posts 6, which project above the railing and have attached thereto truss rods 7, which truss rods brace the outer ends of the bars 3.

Extending vertically through the center of the platform 4 is a mast 8, preferably constructed of a plurality of rods, the lower end of the mast extending below the frame 1 and has secured thereto a tank 9, said tank being adapted to contain a supply of gas.

Within the frame 1 are a plurality of bag sections 10, which are adapted to be filled with gas and fit between the braces 2, said bag sections filling the frame 1 and extending a distance thereabove, the gas within the bag sections being sufficient to support the airship and carry the same through space.

The bag sections are filled with gas in the usual manner and as the gas escapes from the bag sections, a new supply is provided therefor from the tank 9, the gas being conveyed to the bag sections through feed pipes 11, which extend from the tank upwardly through the platform 4 and are connected to cross pipes 12 and communicating with said cross pipes are a plurality of tube sections 13, which communicate with the bag sections, there being one tube for each bag section and the flow of the gas through said tube sections is regulated by valves 14.

Immediately above the tank 9 is a passenger compartment 15, leading from which are run-ways 16, the outer ends of which terminate in bridges 17 and from which instructions are given for the guiding of the airship.

The officers in charge of the airship are stationed on the bridges 17 and communication is established between the officers and other parts of the ship through the medium of telephones or speaking tubes 18.

The bridges are extended forwardly and rearwardly of the airship and project beyond the outer edge of the frame 1, so that the officers or operators will have a clear view in guiding the ship, the bridge and run-way being suitably supported by brace beams 19, which extend from the lower edge of the tank to the outer edges of the bridges.

Immediately above the bridges 17 and resting upon the projecting ends of the bars 3 are platforms 20, upon which are rotatably mounted shafts 21, which shafts extend the length of the platforms 20 and have fixed thereto beveled gears 22.

Meshing with the gears 22 and extending at right angles thereto are gears 23, which are fixed to the inner ends of propeller shafts 24, said propeller shafts extending through suitable bearings 25 and having propellers 26 attached to their outer ends, which propellers project beyond the platforms. The object of said propellers is to control the movement of the airship, the propellers carried by one platform being employed for moving the ship in one direction and the propellers on the opposite platform being employed for moving the ship in the opposite direction.

Power is applied to the shaft 21 to operate the propellers in any suitable manner, as by means of a vertical shaft 27, which connects at its upper end through the medium of bevel gears 28 and 29 with the shaft 21, the lower end of the vertical shaft having a pinion 30 thereon, which meshes with a driving gear 31 on a supporting shaft 32 and by attaching a crank 33 to one end of the driving shaft 32, it will be readily seen that power may be manually applied to operate the propellers.

The propelling medium for the propellers is preferably placed on the bridges 17 and it will be clearly understood that instead of applying the power manually, motors or the like may be used for the purpose.

Extending upwardly from the run-ways 16 are ladders 34, so that access may be had to the platforms 20 at any time.

The ship is caused to ascend or descend by extending a shaft 35 vertically of the mast 8 and through a bearing cap 36 at the upper end of the mast, a propeller 37 being attached to the upper end of said shaft, so that when the shaft is rotated in opposite directions, the airship will be caused to ascend or descend.

Power is applied to the shaft 35 in any suitable manner, as by fixing thereto a belt wheel or sprocket 38, with which coöperates a belt 39, the opposite end of the belt being extended around a drum 40 and by rotating said drum, the shaft 35 will be rotated and the propeller at the upper end thereof operated.

Power may be applied in any suitable manner to the drum 40, but in the present instance, I have shown a crank 41 attached thereto, by means of which power may be manually applied to operate the propeller.

By forming the gas bag in sections, it will be readily apparent that should any one of the bags become punctured or the gas otherwise escape therefrom, the remainder of the bags will be sufficient to support the ship and in fact, it would be necessary for a number of the bags to become empty before the ship would descend by its own weight.

To better retain the ship on an even keel, wings 42 are placed on opposite sides of the ship and are preferably attached to the frame 1 adjacent its upper edge, while the bridges 17 are also provided with wings 43 on opposite sides of the bridges, said wings serving to hold the ship against rocking motion.

If by accident the ship should descend into a body of water, I provide a plurality of floats or hollow bodies 44, which are attached to frames 45 depending from the main frame 1, the lower edges of the floats being substantially in line with the bottom of the tank and by forming the floats air-tight, it will be readily seen that they will provide a sufficient buoyancy to prevent the ship from sinking into the water.

The bottom of the tank 9 is preferably provided with a plurality of supports 46, upon which the airship rests when not in the air, said supports raising the tank a sufficient distance from the ground to prevent injury thereto.

Any suitable form of anchoring means may be employed for the ship when resting upon the ground and when the ship is released from its anchoring means, the gas within the bag sections will cause the ship to rise and float through the air and the ship can be propelled against the wind by operating the propellers at the opposite ends of the ship.

If for any reason it is desired to elevate the ship above the point to which the gas will carry the same, the propeller 37 is rotated in one direction, or if it is desired to lower the ship, the propeller is rotated in the opposite direction.

If when landing the airship it is discovered that an object is about to be encountered, the propellers 26 may be operated to move the ship out of the path of the object or the propeller 37 may be operated to raise the ship above the object and by having telephonic communication between the several stations, orders for operating the various propellers may be given without the attendant leaving his station.

What I claim is:—

1. In an airship, the combination with a frame, said frame being circular in general outline and semi-circular in cross section, braces for said frame and bars extending across the upper edge of the frame, the braces dividing said frame into compartments, of bag sections entering said compartments, means to direct gas into said bag sections, propeller blades mounted upon the ends of said bars, means to rotate said propeller blades, a mast, a propeller carried by said mast and means to rotate said propeller in opposite directions, whereby the airship will be raised or lowered.

2. In an airship, the combination with a frame, bars extending across said frame and dividing the frame into compartments, a bag section carried in each of the compartments adapted to receive gas, of platforms at the ends of said bars, a shaft rotatably mounted on each platform, propellers blades connected to said shaft, a bridge below each platform and means carried by the bridges and coöperating with said shafts, whereby power may be applied to the propellers blades and the airship driven by the action thereof.

In testimony whereof I have signed my name to this specification in the presence of two subscribing witnesses.

GUSTAV SCHEEL.

Witnesses:
AUGUST WALZ,
HERMAN HAUSSMANN, Jr.

Copies of this patent may be obtained for five cents each, by addressing the "Commissioner of Patents, Washington, D. C."